(12) United States Patent
Hawkes et al.

(10) Patent No.: US 7,373,805 B2
(45) Date of Patent: May 20, 2008

(54) APPARATUS FOR DIRECTING PARTICLES IN A FLUID

(75) Inventors: Jeremy John Hawkes, Cardiff (GB); Michael J Long, Cardiff (GB); William Terence Coakley, Cardiff (GB); Martin Bernard McDonnell, Salisbury (GB)

(73) Assignee: The Secretary of State for Defence (GB)

( * ) Notice: Subject to any disclaimer, the term of this patent is extended or adjusted under 35 U.S.C. 154(b) by 0 days.

(21) Appl. No.: 10/527,887

(22) PCT Filed: Mar. 18, 2003

(86) PCT No.: PCT/GB03/01125

§ 371 (c)(1),
(2), (4) Date: Aug. 18, 2005

(87) PCT Pub. No.: WO2004/024287

PCT Pub. Date: Mar. 25, 2004

(65) Prior Publication Data

US 2006/0096353 A1    May 11, 2006

(30) Foreign Application Priority Data

Sep. 16, 2002 (GB) .................................. 0221391.6

(51) Int. Cl.
*G01N 15/06* (2006.01)
*G01N 29/00* (2006.01)
*H04B 17/00* (2006.01)

(52) U.S. Cl. .................. 73/61.71; 73/73; 73/61.75; 73/570.5; 367/13

(58) Field of Classification Search ............... 73/570.5, 73/61.71, 61.75; 367/13; 209/590, 659; 210/748; 406/137
See application file for complete search history.

(56) References Cited

U.S. PATENT DOCUMENTS 4,743,361 A * 5/1988 Schram .......................... 209/1

(Continued)

FOREIGN PATENT DOCUMENTS

| EP | 0380194 | 8/1990 |
|---|---|---|
| EP | 0633049 | 1/1995 |

OTHER PUBLICATIONS

Hawkes, et al., "Force field particle filter, combining ultrasound standing waves and laminar flow," 2001, Elsevier Sceince, 213-22.*

(Continued)

*Primary Examiner*—Hezron Williams
*Assistant Examiner*—Jacques M. Saint-Surin
(74) *Attorney, Agent, or Firm*—Dean W. Russell; Kilpatrick Stockton LLP

(57) ABSTRACT

There is disclosed apparatus for directing particles entrained in a fluid, comprising a chamber having a first wall, including means for generating a sound wave having a frequency v, and a second, opposite wall capable of reflecting the sound wave in which the first and second wall define a conduit for the passage of the fluid, and in which the thickness of the second wall is such that the path length of the standing wave in the second wall is a multiple of about ½ the wavelength $\lambda_r$ of the sound wave therein.

21 Claims, 7 Drawing Sheets

U.S. PATENT DOCUMENTS

| | | |
|---|---|---|
| 5,225,089 A | 7/1993 | Benes et al. |
| 5,525,041 A * | 6/1996 | Deak ........................... 417/63 |
| 5,626,767 A | 5/1997 | Trampler et al. |
| 5,711,888 A * | 1/1998 | Trampler et al. ........... 210/748 |

OTHER PUBLICATIONS

J. Hawkes, et al., "Single half-wavelength ultrasonic particle filter: Predictions of the transfer matrix multiplayer resonator model and experimental filtration results," J. Acoust. Soc. Am. 111 (3), pp. 1259-1266, Mar. 2002.

J. Hawkes, et al., "Force Field particle filter, combining ultrasound standing waves and laminar flow," Sensors and Actuators, B75, pp. 213-222, 2001.

Z. Mandralis, et al., "Enhanced synchronized ultrasonic and flow-field fractionation of suspensions," Ultrasonics, vol. 32, No. 2, pp. 113-121, 1994.

* cited by examiner

APPARATUS FOR DIRECTING PARTICLES IN A FLUID

CROSS REFERENCE TO RELATED APPLICATIONS

This application is the U.S. national phase of International Application No. PCT/GB2003/001125 filed on Mar. 18, 2003 and published in English on Mar. 25, 2004 as International Publication No. WO 2004/02487 A1,which application claims priority to Great Britain Application No. 0221391.6 filed on Sep. 16, 2002, the contents of which are incorporated by reference herein.

The present invention concerns apparatus for directing particles in a fluid. The present invention is particularly, although not exclusively, concerned with apparatus utilising an ultrasound standing wave having a single pressure node in the fluid to direct particles to a plane surface boundary.

It is known that the creation of an ultrasound standing wave in a fluid comprising a suspension of particles exerts a force on the particles, which acts to direct them towards a pressure node or a pressure antinode. In particular, it is known that bacteria in aqueous suspension are directed towards pressure nodes on account of the fact that their mass density and the speed of sound therein are greater than in water. By contrast, oil droplets or air bubbles in water are directed to pressure antinodes because their mass density and the speed of sound therein are lower than in water.

The magnitude and direction of these acoustic radiation forces have been extensively discussed. See for example, King, L. V. Proc. R. Soc., 1934, London A147, 212-240, Yosioka, K. and Kawasima, Y., Acustica, 1955, 5, 167-173, Gor'kov, L. P., Sov. Phys. Dokl., 1962, 6, 773-775, Nyborg, W. L., J. Acoust. Soc. Am., 1967, 42, 947-952, Crum, L. A., ibid., 1971, 50, 157-163, Gould, R. K. and Coakley, W. T, Proc. 1973 Symp. on Finite-Amplitude Wave Effects in Fluids (Pergamon Press, Guildford, UK 1974), pp 252-257, Whitworth, G. and Coakley, W. T., J. Acoust. Soc. Am., 1992, 91, 79-85 and Gröschl M., Fundamentals Acustica—acta acustica, 1998, 84, 432-447.

It is well known that pressure antinodes in an acoustic standing wave system generally occur at a boundary or boundaries between materials having significantly different acoustic impedance. For example, pressure antinodes occur at a boundary between water and stainless steel or glass layers. It has not, until now, been possible to direct particles to a boundary surface by arranging for a pressure node at that surface. Thus, U.S. Pat. Nos. 5,225,089, 5,626,767, EP 0 633 049 and EP 0 380 194 all disclose acoustic apparatus for directing particles in which a pressure antinode is present at boundary surfaces.

The position of pressure nodes in an ultrasound standing wave system is of particular interest when it is desired to generate a standing wave having a single node in the fluid layer. Such systems require that the width or thickness of the fluid layer is a half or a quarter of the wavelength $\lambda_f$ of the standing wave in the fluid.

The system comprising a half wavelength thickness, herein referred to as the $\lambda/2$ system, is known to the art and extensively discussed by Hawkes, J. J. et al., in J. Acoust. Soc. Am., 2002, 111, 1259-1266 and Sensors and Actuators B, 2001, 75, 213-222. An acoustic chamber comprises a first wall having a piezoceramic and a stainless steel transmission layer and a second, reflecting wall of glass. The frequency of the sound wave is selected so that the thickness of the glass reflector is a quarter wavelength of the standing wave in glass in order to ensure the maximum energy in the system is focused in the fluid layer. Pressure antinodes formed at the boundaries of the piezoceramic and steel layer, the steel layer and fluid layer and the fluid layer and glass wall lead to a pressure node for the standing wave at the centre of the fluid layer. The $\lambda/2$ system has been used to filter particles from a fluid (Spengler, J. F. et al., Bioseparation, 2001, 9, 329-341) as well as to move particles from one fluid to another (see our co-pending GB patent application No. GB0223562.0).

The system comprising a quarter wavelength thickness, herein referred to as the $\lambda/4$ system and similar to that described above, has previously been thought to be of no practical value. The apparent requirement that the frequency of the sound wave is selected so that the thickness of the glass reflector is a quarter wavelength of the standing wave in glass limits the system. In particular, a pressure node can only occur at the boundary of the fluid layer and one or other of the steel layer or glass wall. However, because a pressure node must also occur at boundaries contacting air, on account of the low acoustic impedance of air, a phase change may occur in the standing wave system. This phase change invariably occurs at the piezoceramic so that a pressure node is formed not at the boundary between the fluid and the glass wall as is desired for many practical applications but at the boundary of the steel layer and the fluid.

A number of approaches to this problem have focused on so called "pressure release" at the reflecting wall. In particular, attempts have been made to minimise the thickness of the glass reflector or to substitute a material with similar acoustic properties to the fluid. However, these approaches are largely impractical or fail in that the required thickness makes the reflector difficult to fabricate and handle and prone to shatter on mechanical shock or in that a standing wave is not produced.

Applicant has now surprisingly found that selection of the frequency and/or the thickness of the reflector in both the $\lambda/2$ system and the $\lambda/4$ systems is of practical value for directing particles to one or more fluid boundary surfaces.

Accordingly, in one aspect, the present invention provides apparatus for directing particles entrained in a fluid, comprising a chamber in which a first wall including means for generating a sound wave of frequency $\nu$ and a second opposite wall capable of reflecting the sound wave in which the first and second walls define a conduit for the passage of the fluid and in which the thickness of the second wall is such that the path length of the standing wave in the second wall is a multiple of about ½ of the wavelength $\lambda_r$ of the sound wave therein.

It will be understood that the selection of the thickness of the second wall (or the frequency $\nu$ of the sound wave) such that the path length of the standing wave in the second wall is about ½ $\lambda_r$, leads to a pressure node at one or other or both of the fluid boundary surfaces. In particular, it will be appreciated that the second wall resonates at the selected frequency and as a result the relatively high acoustic impedance of the wall in relation to the fluid is effectively reduced to zero. Further, although the energy in the system is focused in the resonating second wall, the magnitude of the force acting on the particles at the node is still sufficient to drive particles across the direction of laminar flow in a fluid. In this regard, it observed that at the selected thickness or operating frequency the heat generated by the resonance of the second wall leads to only a very small increase in local temperature (5 to 10° C.).

The present invention does not require that the thickness of the second wall or the frequency $\nu$ of the sound wave is such that the path length of the standing wave in the second wall is a multiple of exactly λ/2 of the wavelength of sound therein. In particular, the term "a multiple of about ½ $\lambda_r$,", as used herein, will be understood to mean that the path length is within +/−5% of the theoretical value for n (½) the wavelength $\lambda_r$ of sound in the second wall where n is an even or odd integer including 1.

The selection of the thickness of the reflector or the frequency of the sound wave such that the path length of the standing wave is a multiple value of ½ $\lambda_r$, must, however, not increase the local temperature to such an extent that the speed of sound and, therefore, the wavelength of the standing wave in the second wall is significantly changed. Preferably, the value of n ranges from 1 to 5. Still more preferably, the thickness of the second wall is about ½ $\lambda_r$. (n=1)

It will be understood that, subject to the requirement for sufficient energy in the fluid layer, the thickness of the first wall is not critical to the present invention. Preferably, the thickness of the first wall is an odd multiple (n is an odd integer) of ½ or ¼ of the wavelength $\lambda_g$ of the sound wave therein. Still more preferably, the thickness of the first wall is ½ of the wavelength $\lambda_g$ of the sound wave in therein.

In preferred embodiments of the present invention, the apparatus further comprises a material in contact with the first wall, which is capable of transmitting the sound wave. The inclusion of a coupling layer on the inner surface of the first wall is well known to the art. The thickness of the coupling layer is, subject to the energy requirement, not critical to the present invention. However, the preferred thickness is an even or odd multiple (n is an even or odd integer) of ½ or an odd multiple (n is an odd integer) of ¼ of the wavelength $\lambda_t$ of the sound wave in therein.

Further, the width of the conduit is, subject to the energy requirement, not restricted by the present invention. Preferably, however, the width of the conduit is an even or odd multiple (n is an even or odd integer) of ½ or an odd multiple (n is an odd integer) of ¼ of the wavelength $\lambda_f$ of the sound wave in therein. Of course, where the width is ½ or a multiple of ½ of the wavelength $\lambda_f$ of the sound wave in the fluid more than one pressure node is present in the fluid layer. However, in this system, a pressure node will always be present at the boundaries of the fluid layer. Similarly, where the width of the conduit is an odd multiple of ¼ of the wavelength $\lambda_f$ of the sound wave in the fluid, a plurality of pressure nodes will also be present. However, in this system, a pressure node will always be present at the boundary of the fluid layer with the second wall.

In a highly preferred embodiment of the present invention, however, the width of the conduit is a ¼ of the wavelength $\lambda_f$ of the sound wave in the fluid. In this embodiment a single pressure node is present in the fluid layer and located at the boundary of the fluid layer and the second wall. This embodiment is particularly advantageous in that the particles in the fluid are driven solely to the boundary surface between the fluid layer and the second wall.

As mentioned previously, the energy of the standing wave in the system of the present invention is an important consideration. Preferably, therefore, the frequency v, the thickness of the first and second wall and the width of the conduit are such that the overall path length of the standing wave (i.e. $\Sigma \lambda_r, \lambda_t, \lambda_f, \lambda_g$) in the system is a multiple of λ/2. Sufficient energy, at desired operating frequencies and thickness, can be obtained by selection of the amplitude of the sound wave generated by the first wall In preferred embodiments of the present invention, the material capable of generating an ultrasound wave comprises a piezoceramic. In these embodiments, the apparatus further comprises means for applying an alternating potential to the piezoceramic. The magnitude of the applied alternating potential controls the amplitude of the sound wave. Preferably, the frequency of the applied potential is at or adjacent the fundamental resonance frequency of the piezoceramic. However, other frequencies may also be used. Of course, other sources of ultrasound, including lasers and electrostatic actuators may also be used.

The materials of the transmission layer and the second wall may comprise any such as are known to the art. Preferably, the material capable of reflecting the sound wave comprises glass. Advantageously, the second wall comprises a glass microscope slide. The transmission layer may comprise, in particular, steel, carbon or silicon.

The apparatus according to the present invention may also comprise means providing for the flow of the fluid through the conduit. Preferably, the means comprise a pump or the like.

The present invention allows the manipulation of particles in a fluid to one or other or both of the fluid boundary surfaces. The invention therefore offers alternative possibilities for filtering particles from the fluid by, for example, collection at one or more of these surfaces.

In preferred embodiments of the present invention, the apparatus further comprises means for detecting particles at or adjacent the first and/or second walls of the chamber.

In a highly preferred embodiment, the width of the conduit is such that the path length of the standing wave therein is a ¼ of the wavelength $\lambda_f$ of the sound wave in the fluid (a λ/4 system). In this embodiment the detection means is provided at the second wall since only a single pressure node, located at the boundary of the fluid and the second wall is present in the fluid layer.

The present invention is not limited by any particular means for detecting the particles. The apparatus may comprise any suitable detection means for detecting particles known to the art. Preferably, however, the detection means comprises a biosensor including a sensing medium capable of sensing particles such as bacteria, viruses, DNA, proteins and the like. Still more preferably, the detection means comprise an optical biosensor.

The sensing medium may, in particular, comprise an agarose or dextran gel matrix supporting a capture agent specific for particles of interest. Preferred forms of capture agents include antibodies or lectins. Of course the sensing medium may comprise other inert matrices and/or support a plurality of capture agents specific for different particles.

In one embodiment, the second wall is, at least in part, provided with a layer of the sensing medium. In particular, the second wall and the sensing means may comprise a surface plasmon resonance (SPR) sensor chip, a metal clad leaky waveguide (MLCW) sensor chip or the like. Such chips enable the detection of captured particles by a shift in the coupling angle of light incident the under side of the chip to an evanescent wave in the sensing medium or the fluid. See for example, our co-pending patent application PCT/GB02/045045 incorporated by reference herein.

The detection means may further comprise a microscope, a CCD video camera and/or an image analysis system. Alternatively or additionally the detection means may comprise means detecting a shift in the coupling angle of light to an evanescent wave in the sensing medium or the fluid. The detection means may, in particular, image the upper surface of the chip or may instead image light scattered or emitted from the particles on the chip.

The detection of the particles does not, however, necessarily require that the second wall or chip can be dismantled from the apparatus. In particular, it will be apparent that an SPR or MCLW chip permits that detection may be carried out directly and even during sonication. Preferably, however, the second wall or chip can be removed from the apparatus so as to minimise vibration effects and/or facilitate detection by monitoring light scattered or emitted from the sensing medium of the chip. The removal of the chip advantageously permits its replacement and/or substitution.

The concentration of the particles in the sample fluid may promote the formation of aggregates, which may reduce the capture of particles by the sensing medium. Preferably, therefore, the apparatus includes means for optimising the concentration of the particles in the fluid in conjunction with the flow rate and pressure gradient. Such means may comprise means for filtering or diluting the fluid.

Of course, the selection of the width of the conduit need not be limited to a $\lambda/4$ system. In particular, the apparatus may alternatively comprise a $\lambda/2$ system in which a pressure node occurs at both fluid boundary surfaces. In this embodiment, the detection means may be provided at the piezoceramic or coupling layer and/or the second wall. Preferably, the detection means provided on the transmission layer or piezoceramic comprises a regenerable, biological sensing medium. The regeneration of the sensing medium enables multiple use of the chamber without the expense of providing a new piezoceramic or coupling layer.

Other embodiments comprising multiple $\lambda/4$ and $\lambda/2$ systems may also be used provided the penalty of a plurality of pressure nodes is acceptable for the purposes of detection.

In a second aspect the present invention provides a method for detecting particles in a fluid comprising the steps of i) passing the fluid through a chamber comprising a first wall including means generating a sound wave of frequency $\nu$ and a second opposite wall capable of reflecting the sound wave which together define a conduit for the passage the fluid and detection means for detecting particles at the first and/or second walls ii) selecting the frequency $\nu$ such that the path length of the standing wave in the second wall is a multiple of about ½ of the wavelength $\lambda_r$ of the sound wave therein and iii) detecting the particles.

The chamber may comprise any of the features of the embodiments of the apparatus according to the first aspect of the present invention. Preferably, however, the width of the conduit in the chamber is ¼ of the wavelength $\lambda_f$ of the sound wave in the fluid and detection means is provided at the second wall.

The optimum capture of particles is dependent on the flow rate of the fluid in the conduit as well as the pressure gradient in the fluid. The optimisation of the flow rate will be within the skill of the ordinary practitioner. Preferably, the flow rate is such that the flow in the conduit is laminar and the residence time of the fluid in the conduit permits maximum capture of the particles on the sensing medium. The optimisation of the pressure gradient and flow rate should, however, preferably avoid the formation of aggregates of the particles, which may reduce the possibility of their capture at the second wall.

The concentration of the particles in the sample fluid may promote the formation of aggregates, which may reduce the capture of particles by the sensing medium. The method may, therefore, comprise a preliminary step of adjusting the concentration of the particles in the fluid.

The detection step may be performed using any suitable technique. Preferably, the detection step relies on an evanescent technique, such as surface plasmon resonance, and sensing means comprising a biological sensing medium on which the particles are captured. A change in the local refractive index of the medium on capture of the particles leads to a shift in the angle of incident light required for resonance.

The method of the present invention may comprise the additional step of removing the second wall and sensing medium from the chamber prior to the detection step. In this embodiment, vibration effects may be avoided and the evanescent technique may be permit detection of light scattered or emitted from the sensing medium. Alternatively, or additionally the detection step may comprise visualisation of particles captured on the sensing medium by a microscope, video camera and/or imaging system or on light scattered or emitted from captured particles.

The apparatus and method of present invention provide enhanced detection of particles, and in particular, pathogens such as bacteria or viruses, through ultrasonic deposition on a surface sensor. The invention offers improved sensitivity over other apparatus in that the ultrasonic force acting on particles of diameter in the order of 1 μm is able to overcome the. slow diffusion rate and, in particular, to cause them to cross the parallel flow lines in a fluid in laminar flow. A particular advantage of the invention lies in the fact that the second wall and associated sensing means can comprise a cheap arrangement of a microscope slide and sensing medium which can be removed and replaced.

The present invention will now be described with reference to a model study, a preferred embodiment and the accompanying drawings in which FIG. 1 is a schematic representation of the an acoustic chamber according to the present invention;

Figure 1:
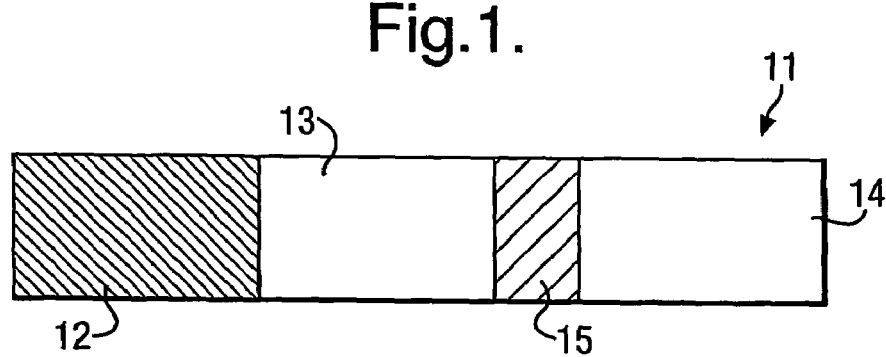

Having regard now to FIG. 1, there is shown an acoustic chamber, generally designated 11, comprising a first, transducer wall 12 comprising a piezoceramic and a transmission layer 13 comprising stainless steel, and a second, reflecting wall 14 also comprising stainless steel. The first and second walls define a conduit 15 for the passage of a water layer.

A transfer matrix model, described by Nowotny, H. et al, in J. Acoust. Soc. Am., 1987, 90, 1238-1245, simulating acoustic wave propagation of through the system was executed for a number of configurations of the acoustic chamber. The physical properties of the materials modelled are given in Table 1. (The model has recently been experimentally validated by Hawkes, J. J. et al., ibid. 2002, 111, 1259 and Grölschl, M. Fundamentals Acustica—acta Acustica, 1998, 84, 432-447.).

The positioning of desired pressure nodes between the chamber walls was examined. A system of fundamental frequency of 3 MHz and acoustic quality factors of 1000 for the different layers was assumed although previous fitted quality factor results were 150 and 350 for the water layer and the piezoceramic respectively. Values for pure water is more than 10,000 and the piezoceramic used are, however, quoted. The piezoceramic was assumed to have a source voltage of amplitude 1V and a source resistance of 50 ohms. The model does not take into account the glue layer used to fix the transmission layer to the piezoceramic.

The thickness of the transmission layer and the reflector are modelled at 3 MHz with values that exactly correspond to $\lambda/2$ or $\lambda/4$ or 0. The width of the conduit or thickness of the water layer was modelled at 3 MHz with a value exactly corresponding to ½ $\lambda_f$ and ¼ $\lambda_f$. These dimensions are also shown in Table 1 (mm). Results are expected to be similar for systems in which the thickness of these layers corresponds to multiples of ½ λ and ¼ λ. For example, a ¼ λ layer is expected to behave in a similar manner to ¾ λ, 5/4 λ etc. layers whilst a ½ λ is expected to behave in a similar manner to 3/2 λ, 5/2 λ etc. layers. However, increasing the path length of the standing wave in the various layers will alter the frequency spectra bringing the peaks closer together (see FIGS. 4 and 5).

TABLE 1

|  | Piezoceramic A | Steel B, D | Water C |
|---|---|---|---|
| Speed of sound/ms$^{-1}$ | 4080 | 6100 | 1500 |
| Mass density/kgm$^{-3}$ | 7700 | 7800 | 1000 |
| Acoustic quality factor | 1000 | 1000 | 1000 |
| Dielectric constant/Fm$^{-1}$ | $1.2 \times 10^{-8}$ | | |
| Tangent of dielectric loss angle | $3.0 \times 10^{-3}$ | | |
| Electromechanical coupling factor | 0.48 | | |
| Electrode area/mm$^2$ | 200 | | |
| Thickness at 3 MHz (Q) | | 0.508 | 0.125 |
| Thickness at 3 MHz (H) | 0.680 | 1.016 | 0.250 |

Referring now to FIGS. 2 to 6, the large number of configurations examined are referred according to a terminology expressing the path length of the standing wave in each layer at 3 MHz as zero (0), a quarter (Q) and half (H) of the wavelength of sound therein. The thickness of the piezoceramic was modelled at a half wavelength throughout and is not therefore referred to in the Figures. It will be apparent that the expression "0HQ" refers to a configuration in which there is no transmission layer, and the thickness of the water layer and reflector correspond respectively to a path length of a half wavelength ($\lambda_f$ 0.25 mm) and a quarter wavelength ($\lambda_r$ 0.508 mm).

Figure 2:
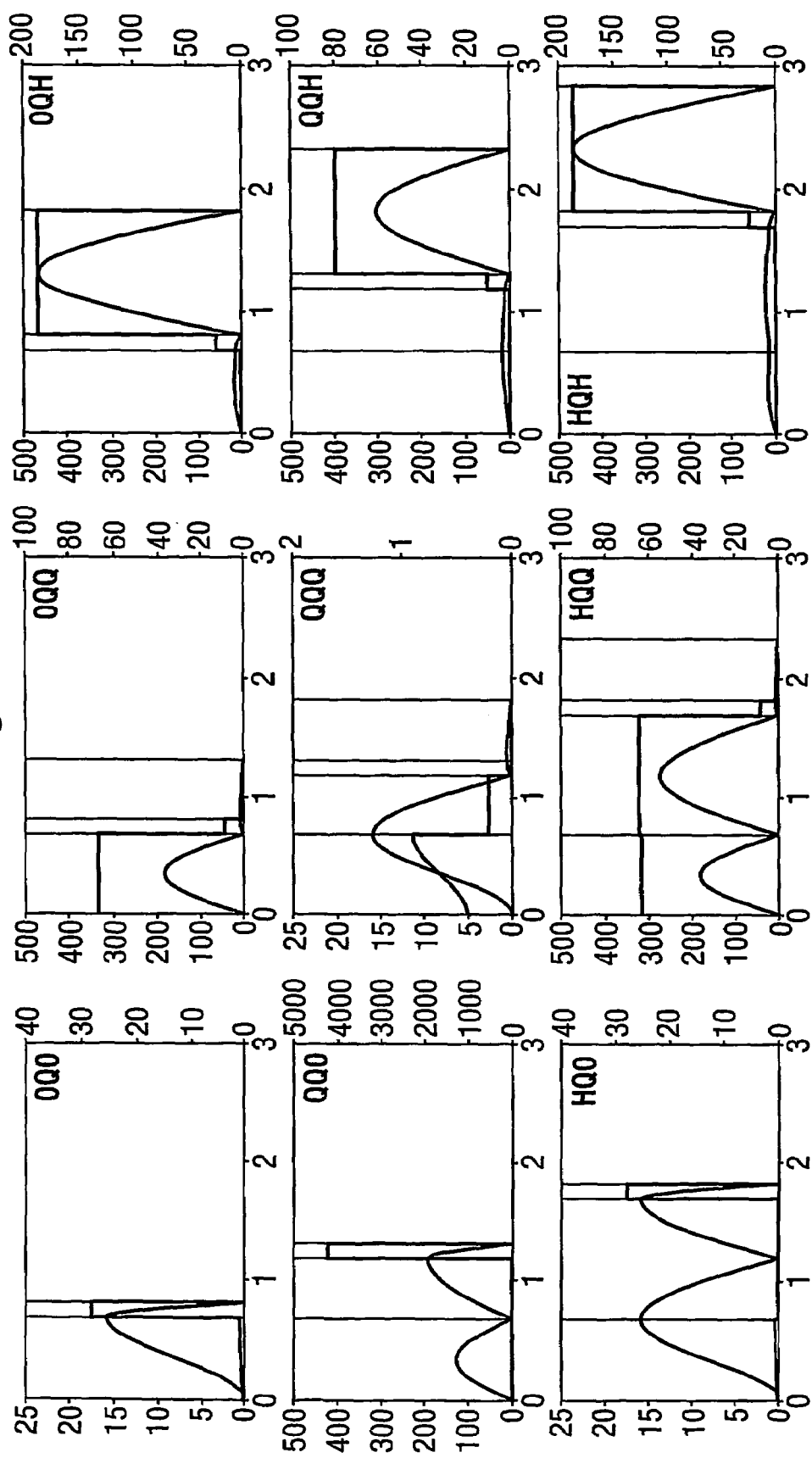
FIG. 2 shows results of the model study in which the distribution of acoustic pressure and energy in the chamber is related to a number of alternative configurations of a $\lambda/2$ system.

The model was examined for the position of a pressure node in the water layer at one or other or both of the fluid boundary surfaces. Referring now to FIG. 2, there are shown results for the spatial distribution of acoustic pressure (left-hand side, kPa) and energy density (right-hand side, J/m$^3$) for all nine possible configurations of a $\lambda/4$ system (0.125 mm, thickness shown along abscissa in mm). The vertical lines indicate the boundary positions in each system.

As may be seen (left-hand column) the absence of the second wall leads, as may be expected, to a pressure node at the boundary of the fluid layer with air in this system. The absence of the second wall means that these three configurations are of no real practical value for the detection of particles. A reflector of thickness providing a path length of ¼ $\lambda_r$ (middle column) leads to a pressure node at the boundary of the fluid layer and the transducer. However, a reflector of thickness providing a path length of ½ $\lambda_r$ (right-hand column) leads to a pressure node in the fluid at or adjacent the reflector surface.

Figure 3:
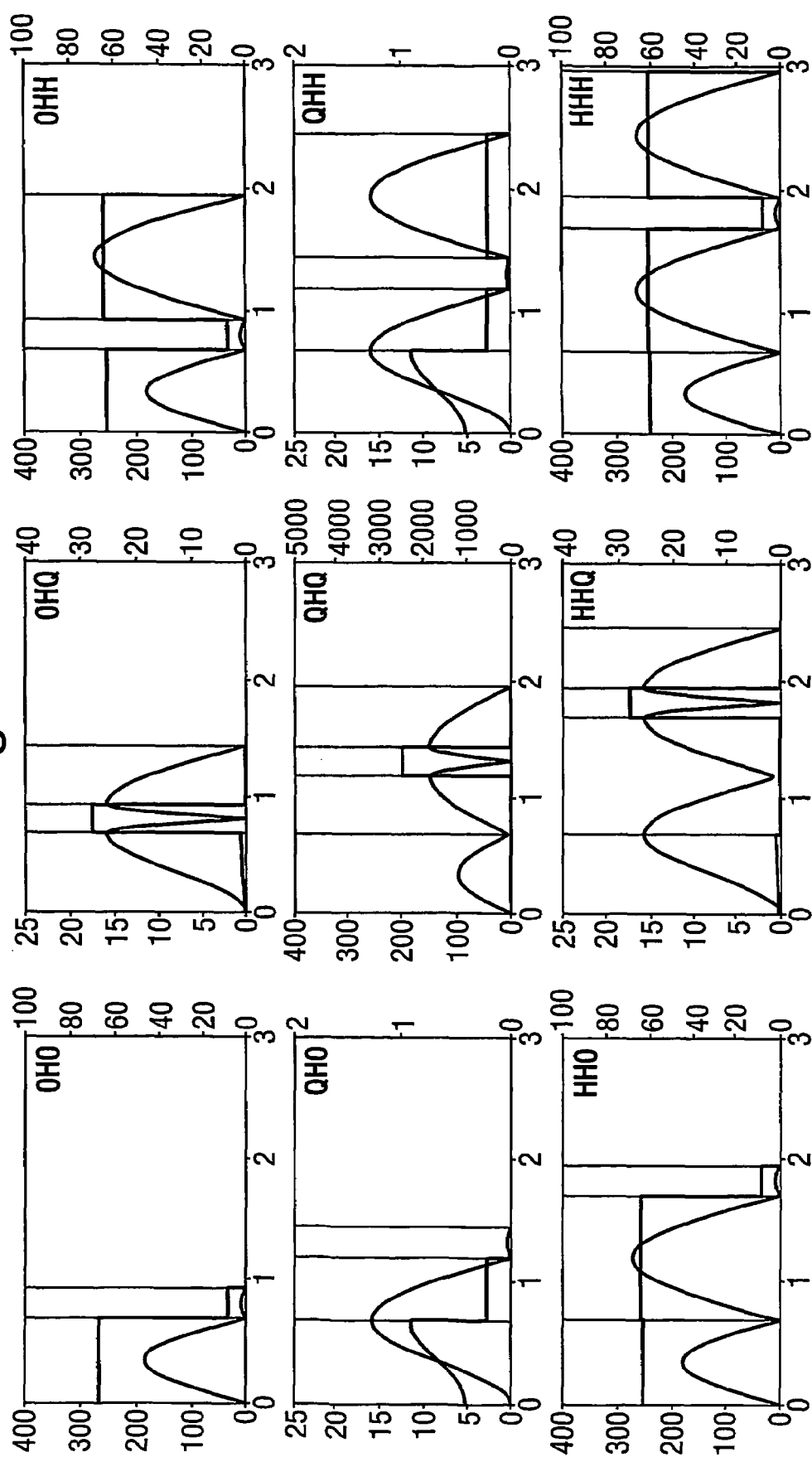
FIG. 3 shows results of the model study in which the distribution of acoustic pressure and energy in the chamber is related to a number of alternative configurations of a $\lambda/4$ system.

Referring now to FIG. 3, there are shown results for the spatial distribution of acoustic pressure (left-hand side, kPa) and energy density (right-hand side, J/m$^3$) for all nine possible configurations of a $\lambda/2$ system (0.25 mm, thickness shown along abscissa in mm). The vertical lines indicate the boundary positions in each system.

As may be seen (left-hand column) the absence of the second wall leads, to an additional pressure node at the boundary of the transducer and the water layer compared to $\lambda/4$ system. A reflector of thickness providing a path length of ¼ $\lambda_r$ (middle column, prior art) leads to a node in the middle of the water layer. However, a reflector of thickness providing a path length of ½ $\lambda_r$ (right-hand column) leads to a pressure node in the fluid at or adjacent the reflector and transducer.

The model shows, therefore, that for configurations in which there is no reflector or a reflector providing a path length of ½ $\lambda_r$, (xy0 or xyH configurations) there is always a pressure node at the outer boundary of the water layer. Further, the model shows that there is an additional pressure node at the lower boundary of the water layer for configurations in which the water layer provides a path length of ½ $\lambda_f$ (xH0 or xHH configurations). A pressure node in the middle of the water layer only occurs for the combination of a water layer providing a path length of ½ $\lambda_f$ and a reflector providing a path length of ¼ $\lambda_r$.

As may be seen from the pressure scales in FIGS. 2 and 3, the acoustic pressures obtained are particularly high where the total acoustic path length of the system is a multiple of $\lambda/2$ (0QQ, QQ0, QQH, HQQ and 0H0, 0HH, QHQ, HH0, HHH).

The acoustic energy density in the water layer is, however, also dependent on the thickness of the reflector. For a reflector of thickness of ½ $\lambda_r$, the acoustic energy is much higher in the reflector than in the water layer because for these configurations the displacement amplitudes have the same maximum value in both layers adjacent the water layer. This follows from the condition of continuity for the displacement that must apply at the water-reflector interface.

Figure 4:
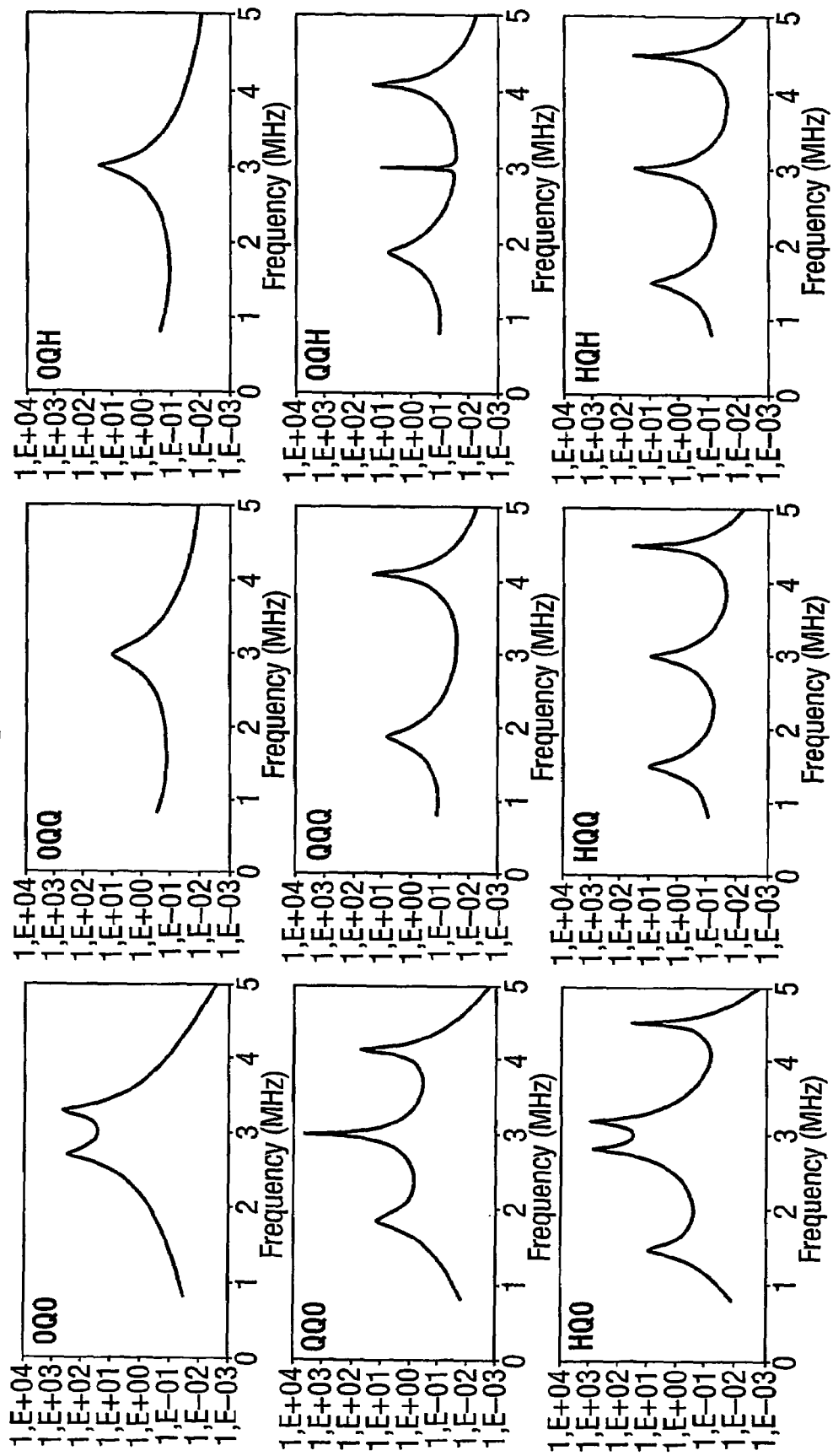
FIG. 4 shows the results of the model study in which the frequency of the acoustic energy in the fluid layer is related to the configurations of FIG. 2.
Figure 5:
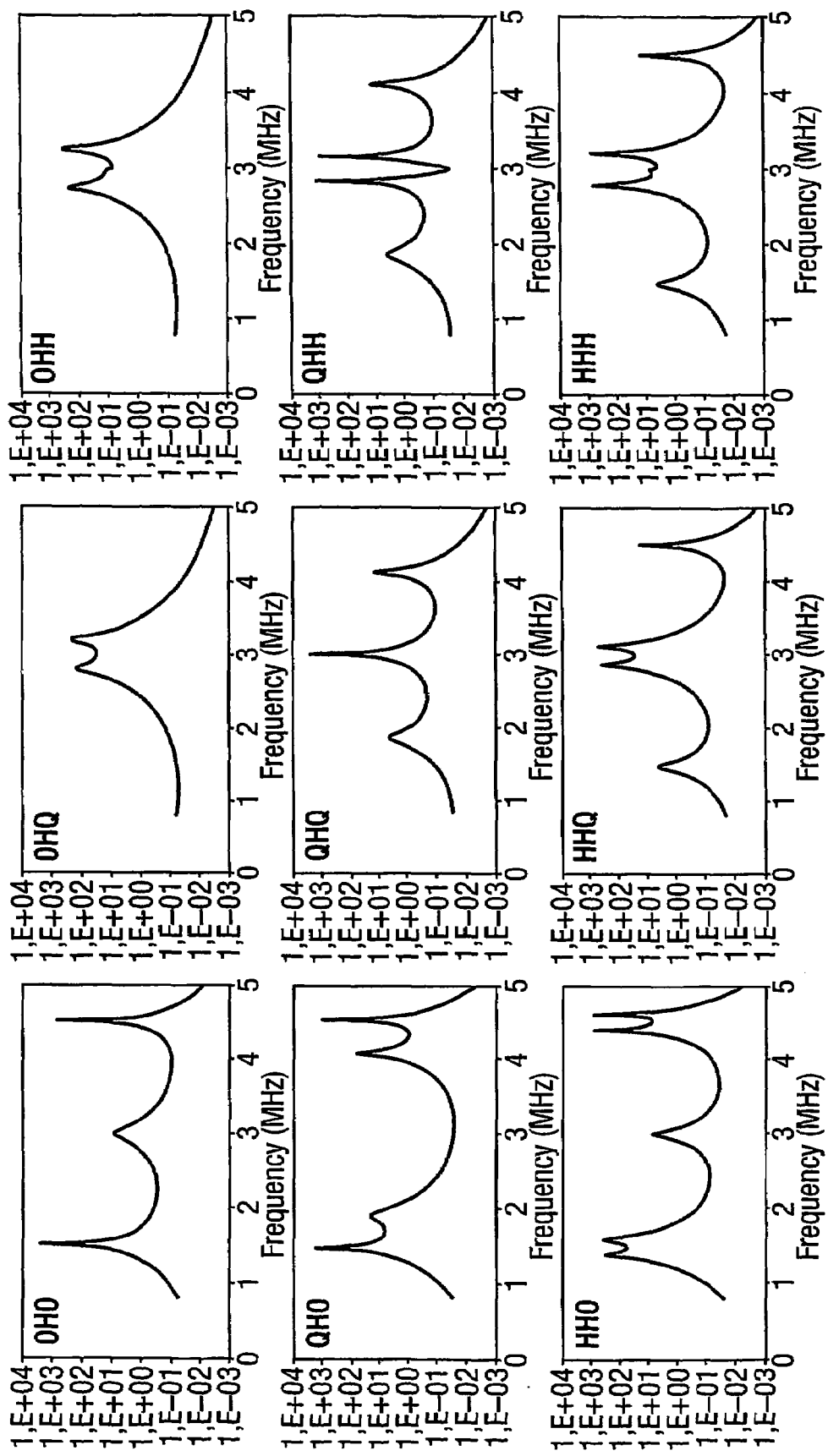
FIG. 5 shows the results of the model study in which the frequency of the acoustic energy in the fluid layer is related to the configurations of FIG. 3.
Figure 7A:
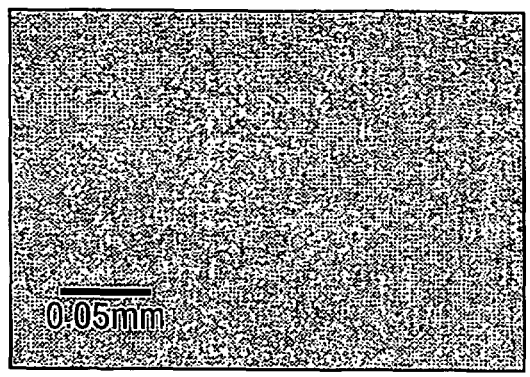
FIG. 7 shows photographs illustrating the collection of *Bacillus subtilis* var *niger* (*B. globiggi*) spores using the apparatus of FIG. 6.
Figure 7B:
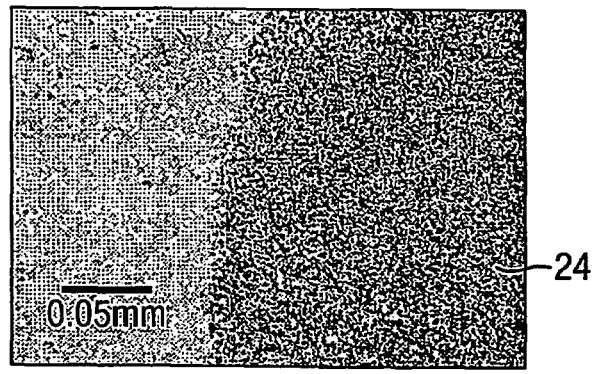
Figure 7C:
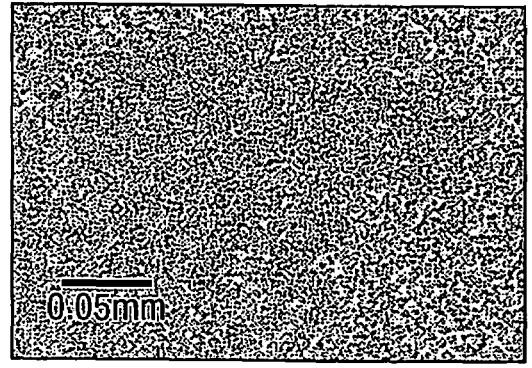
Figure 7D:
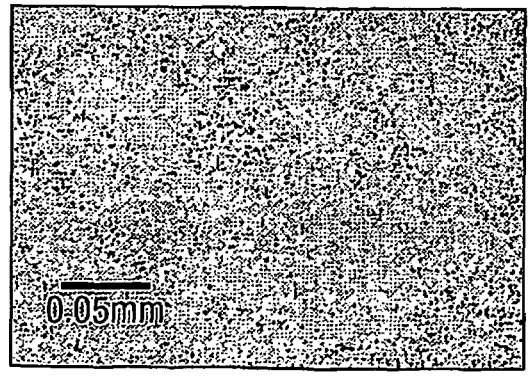

Referring now to FIGS. 4 and 5, the frequency spectra of the acoustic energy density in the water layer are shown for the system configurations of FIGS. 2 and 3 respectively. As may be seen, a maximum acoustic energy in the water layer is obtained for a piezoceramic resonance frequency of 3 MHz for all configurations in which the total acoustic path length in the system is a multiple of $\lambda/2$. It will, however, be noted in this regard that the energy in the figures are not wholly indicative of the efficiency of a particular configuration in that the energy density is also a function of the applied voltage and the total electrical input into the system. Nonetheless, it is clear that the best configurations are 0QQ, QQ0, QQH, HQQ and 0H0, QHQ, HH0.

Taken together the results of the model suggest that the most efficient configuration for directing particles to the reflector is QQH. Although the results for 0QH and HQH look very similar to those obtained for 0QQ and HQQ respectively (total acoustic path length a multiple of $\lambda/2$), the similarity is apparently due to a smoothing effect caused by the 50 ohm source resistance. The effect is revealed by the fact that the energy density spectrum for a zero source resistance for the configuration 0QH, for example, is a curve with a double peak (not shown). The double peak is characteristic of configurations in which the total acoustic path length at 3 MHz is not a multiple of $\lambda/2$.

Other configurations not fulfilling the path length criterion show a double peak near 3 MHz (0Q0, HQ0, 0HQ or HHQ) or peaks far below and above 3 MHz (QQQ, QH0). However, the configurations 0HH and HHH show only a very small peak at 3 MHz as well as two larger peaks either either side even though they fulfil the path length criterion at 3 MHz. The effect would appear to be attributable to the smoothing effect of the source resistance which at 3 MHz is large compared to the resonator impedance.

The model provides similar results for pressure node positions and frequency spectra for a transmission layer and reflector consisting of carbon (speed of sound 4260 m/s, mass density 1470 kg/m$^3$) or silicon (speed of sound 8430 m/s, mass density 2340 kg/m$^3$). The model also suggests that a change in the path length of the sound wave in the reflector from ¼ $\lambda_r$ to ½ $\lambda_r$ (especially in configurations 0HH and HHH) can lead to a movement of particles from the centre to the walls of the chamber. Further, particles may also be moved from one wall to another. The model further suggests that it is advantageous to operate at the fundamental resonance of the piezoceramic. However, other operating frequencies are not necessarily excluded and may produce some useful systems.

Figure 6:
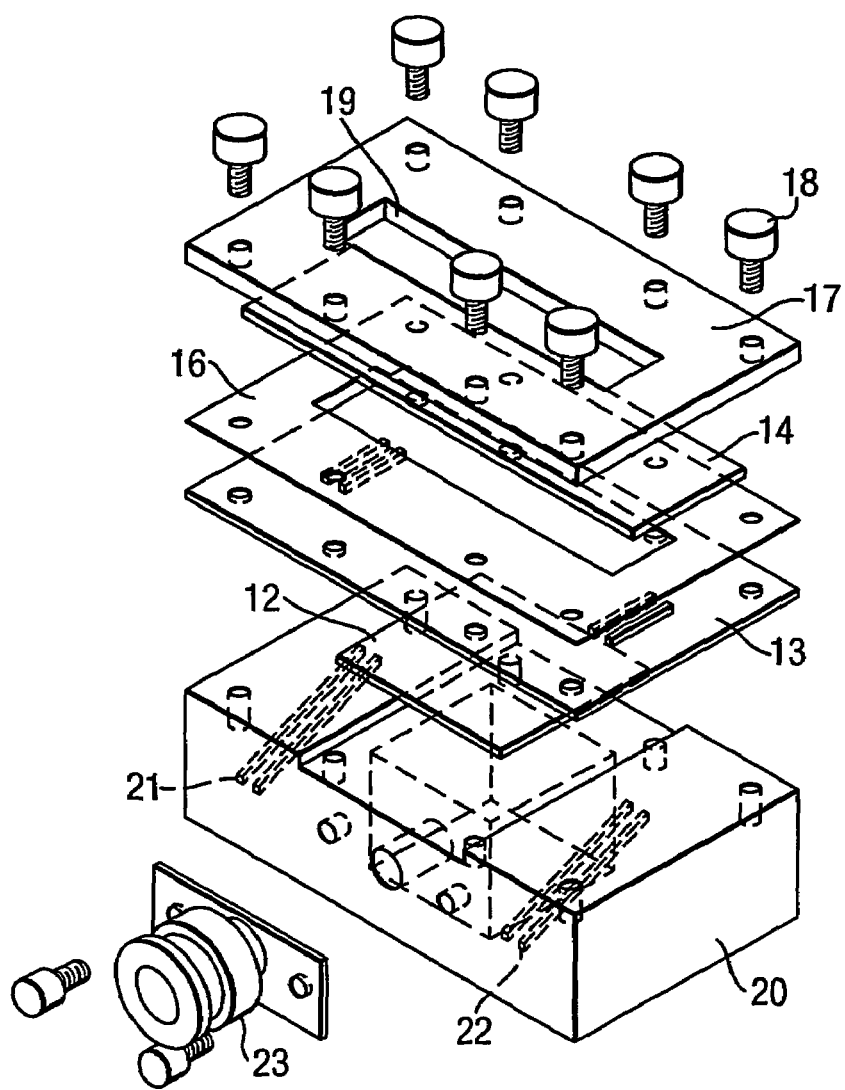
FIG. 6 is an exploded view of apparatus according to a preferred embodiment of the present invention.

The model was experimentally verified using a system of configuration QQH. Referring now to FIG. 6, there is shown an acoustic chamber comprising an electrode 12 formed by a plane ultrasonic transducer (PZ26, 30 mm square, 3 MHz thickness resonance, Ferroperm, Denmark) on which a stainless steel coupling plate 13 (1.5 mm, 3$\lambda_s$/4 at 3 MHz) is glued. The back of the electrode 12 is etched to give a central 20 mm by 10 mm transducer area.

An opposing plane glass acoustic reflector 14 comprising an antibody coated glass microscope slide (1.0 mm, antibodies specific for *B. globiggi*) is held in place by a brass shim spacer 16 and a brass top-plate 17 secured with screws 18. The brass shim spacer 16 (0.125 μm) is arranged between the coupling plate 13 and the glass reflector 14 and comprises an aperture 19 providing a window or field of view (14 mm by 64 mm). A silicon rubber gasket (not shown) located within the window 19 defines a conduit (10 mm×60 mm) for the passage of fluid and forms an air and water seal between the slide 14 and the coupling plate 13. The chamber is fixed to a Perspex® base 20 by screws 18. The base 20 is provided with an inlet 21 and outlet 22 for the passage of the sample and a connector 23 for applying a potential to the transducer. A peristaltic pump (not shown, Gilson minipuls 3) is arranged to pump suspensions of *B. globiggi* into the channel. The generation and control of the frequency and voltage applied to the transducer is performed according to Spengler J. F. et al., Bioseparation, 2001, 9, 329-341 and Hawkes J. J. and Coakley, W. T., Sensors and Actuators, 2001, B, 75, 213-222).

The antibody coated microscope slide was prepared by soaking a pre-silanated slide (SILANE-PREP™, Sigma) in 1% glutaraldehyde solution in de-ionised water over 1 to 3 hours. The slide was washed with phosphate buffered silane (PBS, five times) and dried in a stream of nitrogen. A 100 ug/ml polyclonal rabbit α-BG antibody solution in PBS (200 μl) was applied to a central region of the slide (10 mm by 20 mm). After standing for 3 hours the slide was washed with a PBS solution containing 0.05% Tween™ and the excess solution drained.

The area of the antibody coated region of the slide covers a greater area than etched area of the transducer enabling deposition also to be examined upstream and downstream of the ultrasound field. The field of view was examined during the experiment or following removal of the slide using a video camera and/or microscope.

EXAMPLES

Spore suspensions of *B. globiggi* 24 were prepared by dilution of a concentrated solution of $2\times10^{10}$ c.f.u. ml$^{-1}$ in PBS (pH 7.4). Dilutions of $1\times10^8$ to $1\times10^5$ cfu ml$^{-1}$ were confirmed by haemocytometer count prior to use.

A Polystyrene latex bead (2.8 μm) suspension in water (10% w/v, Polymer Laboratories, UK) was diluted in distilled water to a concentration of $8\times10^6$ beads ml$^{-1}$.

Example 1

A frequency scan for the latex bead solution showed that the optimal frequency for driving the particles to the reflector surface was 2.915 MHz for an apparatus (A) in which the channel width was 178 μm. The optimal frequency was 2.882 Hz for an apparatus (B) in which the channel width was 200 μm. The path length of the standing wave in the water layer in these systems lies between a $\lambda/4$ and $\lambda/2$ wavelength of the speed of sound in water. These frequencies were employed in subsequent experiments.

Example 2

Apparatus A

A suspension of spores ($1\times10^8$ cfu ml$^{-1}$) was passed through the apparatus at a flow rate of 2 ml/min. In the absence of ultrasound the spores were randomly distributed across the field of view with an even concentration throughout the suspension. No contact of the spores with the reflector was identified. However, when the ultrasound was switched on (0.8 V$_{rms}$ applied to the transducer) spore clumps formed in the region of the ultrasound field within one second. The spores remained stationary against the flow and the size of the clumps increased with increased residence time in the field. Removal of the slide from the apparatus showed that only bonded spores remained attached.

The spore deposition to the reflector surface during ultrasonication showed a regular pattern of areas of adherence in which the spacing between the areas appeared to correspond to the half wavelength of sound in water (0.26 mm at 2.90 MHz). This result suggests the possibility of achieving deposition on discrete areas of the slide. Within each area the spores adhered to 40 to 95% of the available surface area. The general position of spore clumps in the chamber did not change during ultrasound exposure. Further experiments focused on these areas.

Referring now to FIG. 7, the deposition of the spores ($1\times10^8$ cfu ml$^{-1}$) in relation to specific regions of the chamber in the field of view are shown. Little or no deposition occurred before the spores reached the area of the ultrasound field (FIG. 7*a*), whereas maximum deposition occurred within the field (FIGS. 7*b* edge and *c* centre). A reduced number of spores adhered to the antibody layer beyond the field (FIG. 7*d*).

Example 3

The applied voltage to the piezoceramic was varied. At 0.2V$_{rms}$ spore ($1\times10^8$ cfu ml$^{-1}$) deposition in apparatus A was negligible compared to deposition at $0.5V_{rms}$. Experiments in this apparatus were continued at $0.8V_{rms}$. Similar observations for apparatus B led to the selection of 3.5 $V_{rms}$.

Example 4

Apparatus B

Figure 8A:
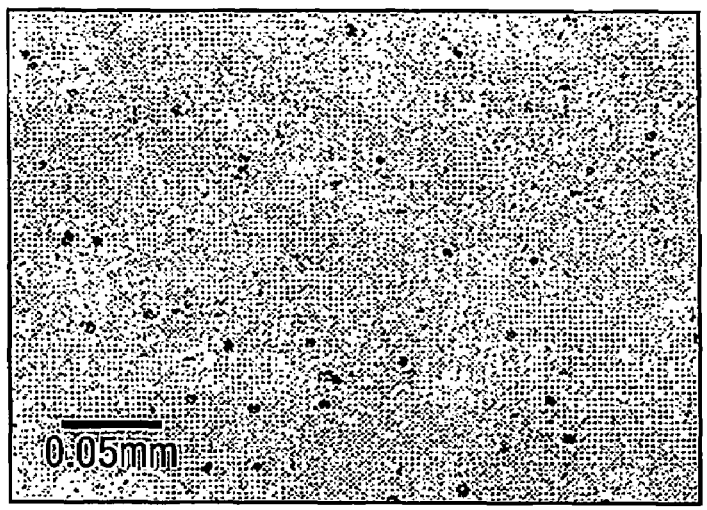
FIG. 8 shows photographs of illustrating the collection of *B. globiggi* at various concentration of sample and residence time.
Figure 8B:
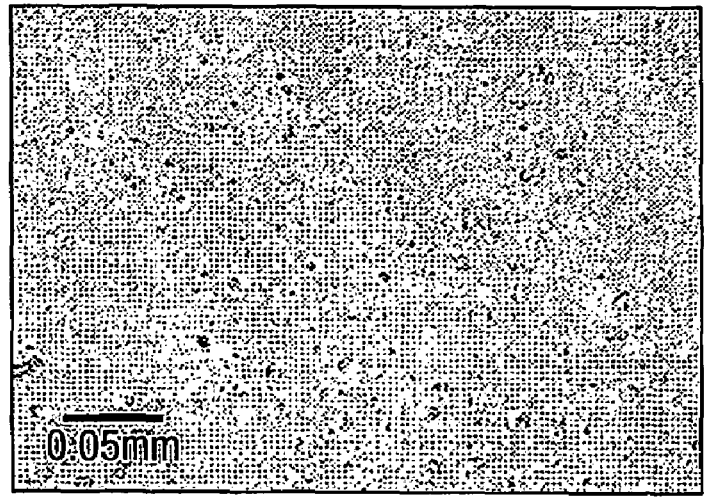
Figure 8C:
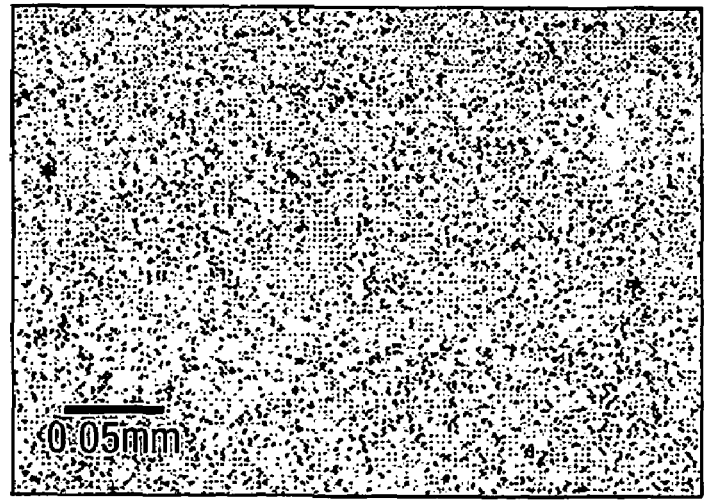

Referring now to FIG. 8, spore deposition to the antibody coated slide was compared after ultrasound exposure (3.5 $V_{rms}$ at a flow rate of 0.4 ml/min) of samples of concentrations and $6.6\times10^{6}$ cfu $ml^{-1}$ for 3 and 30 min and removal of the slide from the apparatus. During exposure the deposition steadily increases (FIG. 8*a,* 0 min, 8*b,* 3 min and 8*c* 30 min).

Example 5

Apparatus B

The lowest concentration at which spores were visible under a microscope on a slide removed from the apparatus after ultrasound was determined to be $3.3\times10^{5}$ cfu $ml^{-1}$. The figure represents a 200-fold increase in sensitivity compared to detection in which ultrasound is not used.

The experimental results confirm the prediction of the model that ultrasonic manipulation of particles to a boundary surface is possible. In particular, they confirm that the acoustic force acting on particles is sufficient to move particles at right angles to the direction of laminar flow. The experiments also confirm, in view of the similarity of the results obtained with both apparatus (in which the variation in width of conduit is about 10%) that optimum movement does not depend on the path length of the standing wave in the fluid layer.

Improved experimental results providing greater sensitivity (to spore concentrations of about $1\times10^{4}$ cfu $ml^{-1}$) are envisaged through optimal design of the reflector leading to better resonance.

The invention claimed is:

1. Apparatus for directing particles entrained in a fluid, comprising a chamber having a first wall, including means for generating a sound wave having a frequency v, and a second, opposite wall capable of reflecting the sound wave in which the first and second walls define a conduit for the passage of the fluid, and in which the thickness of the second wall is such that the path length of the standing wave in the second wall is a multiple of about ½ the wavelength $\lambda_t$ of the sound wave therein.

2. Apparatus according to claim 1, in which the first wall further comprises a coupling layer.

3. Apparatus according to claim 2, in which the width of the conduit is a multiple of ½ or ¼ for the wavelength $\lambda_f$ of the sound wave in the fluid.

4. Apparatus according to claim 3, in which the thickness of the material transmitting the sound wave in the first wall is a multiple of ½ or ¼ of the wavelength $\lambda_t$ of the sound wave therein.

5. Apparatus according to claim 1, in which the thickness of the material capable of generating the sound wave is an odd multiple of ½ of the wavelength $\lambda_g$ of the sound wave therein.

6. Apparatus according to claim 1, in which the total acoustic path length of the wave is a multiple of ½ of the wavelength of the sound wave λ therein.

7. Apparatus according to claim 1, in which the material capable of generating the sound wave is a piezoceramic.

8. Apparatus according to claim 7, in which the frequency v of the sound wave is at or adjacent the resonant frequency of the piezoceramc material.

9. Apparatus according to claim 1, in which the second wall comprises glass, steel, carbon or silicon.

10. Apparatus according to claim 1, in which the material in the first wall capable of transmitting the sound wave comprises steel, carbon or silicon.

11. Apparatus according to claim 1, in which the sound wave is an ultrasound wave.

12. Apparatus according to claim 1, further comprising detection means for detecting particles at or adjacent the first and/or second walls.

13. Apparatus according to claim 12, in which the detection means comprise a biological sensing medium.

14. Apparatus according to claim 13, in which the sensing medium comprises one or more antibodies or lectins.

15. Apparatus according to claim 12, in which the second wall is removable.

16. Apparatus according to claim 12, in which the second wall and the sensing medium comprise a surface plasmon resonance or a metal leaky waveguide chip.

17. Apparatus according to claim 16, in which the detection means further comprise means providing light incident the second wall and means detecting a change in the angle thereof required for resonance or optical coupling.

18. Apparatus according to claim 16, in which the detection means further comprise means detecting light scattered or emitted from the particles.

19. A method of detecting particles in a fluid comprising the steps of i) passing the fluid through a chamber comprising a first wall including means for generating a sound wave of frequency v and a second, opposite wall capable of reflecting the sound wave which together define a conduit for the passage of the fluid and detection means for detecting particles at the first and/or second walls, ii) selecting the frequency v such that the path length of the standing wave in the second wall is a multiple of about ½ of the wavelength $\lambda_t$ of the sound wave therein and iii) detecting the particles.

20. A method according to claim 19, in which the width of the conduit is a ¼ of the wavelength $\lambda_f$ of the sound wave in the fluid.

21. A method according to claim 19, in which the detection step is preceded by the removal of the second wall from the chamber.

* * * * *